United States Patent Office 2,924,821
Patented Feb. 9, 1960

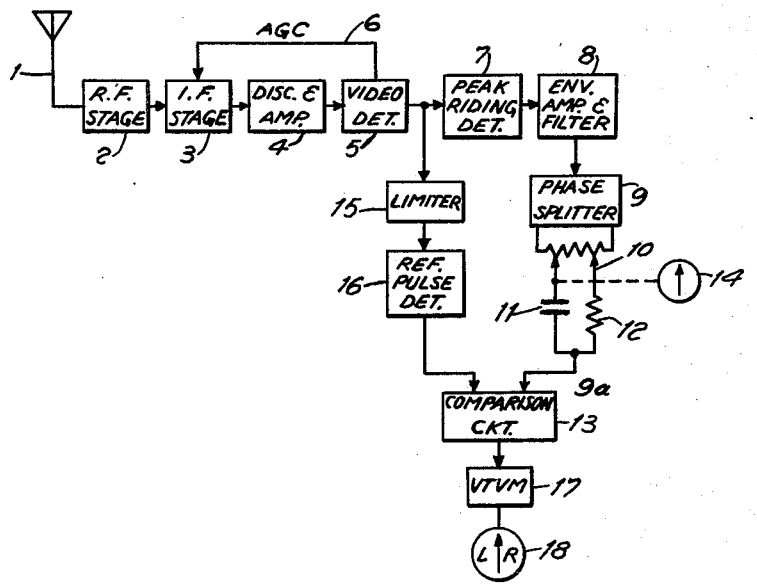
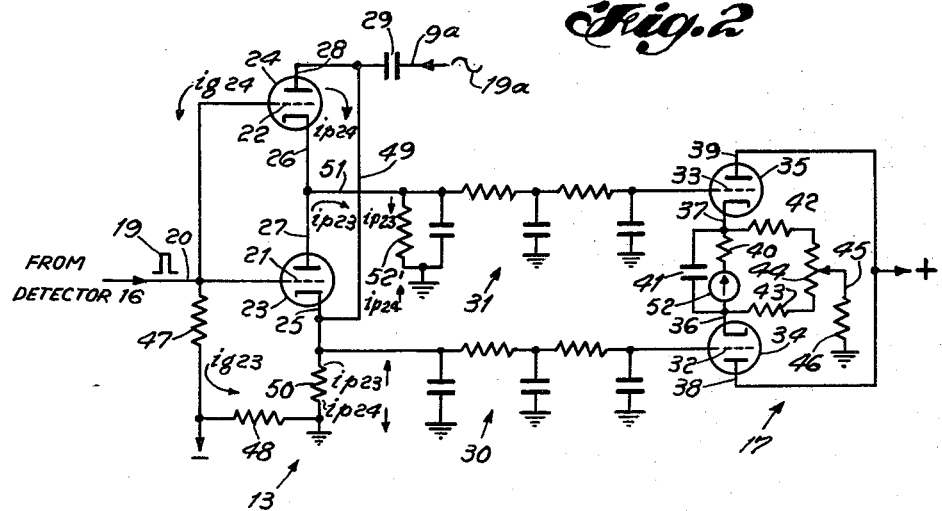

2,924,821
COMPARISON CIRCUITRY

Sven H. M. Dodington, Nutley, and Roy L. Johnson, Summit, N.J., assignors to International Telephone and Telegraph Corporation, Nutley, N.J., a corporation of Maryland Application August 23, 1955, Serial No. 530,129

6 Claims. (Cl. 343—106)

This invention relates to a comparison circuit and more particularly to a phase responsive circuit adapted to produce an indication in response to the relative phase between two input signals.

In many systems, particularly aerial navigation systems, it is necessary to compare the phase of a reference signal with another repetitive signal to obtain an indication dependent upon the phase differences. In such systems it is necessary to be extremely accurate and prevent as far as possible the rendering of a false indication. When using a balanced comparison circuit a false indication is usually rendered when one of the electron discharge tubes draws grid current and thus unbalances the circuit. In the past, in order to prevent the grids of one of the tubes used in the comparison circuit from drawing current, input signals were reduced in amplitude or, alternately, the gain of the circuit was reduced by the introduction of additional resistance. This additional resistance introduced into the circuit resulted in additional loss thus reducing the efficiency and accuracy of the comparison circuitry.

One of the objects of this invention, therefore, is to provide a balanced phase comparison circuit which yields a double-ended output indicative of the phase relation between two input signals.

Another object of this invention is to provide a balanced phase comparison circuit in which a change in the grid current flow results in little or no change in the output voltage and in which a change in the plate current produces a substantial change in the output voltage.

A further object of this invention is to provide a comparison circuit having a double-ended output in which each signal is referred to ground and coupled as one input to a leg of a vacuum tube bridge circuit to yield an indication of the relative difference between two input signals.

One of the features of this invention is the provision of a balanced comparison circuit in which a first signal is coupled to the grids of a pair of electron discharge devices and a second input signal is coupled to the cathode of one device and the anode of the other device in such a manner that the grid currents drawn by each tube produce an in-phase voltage while the plate currents of each tube produce an out-of-phase voltage resulting in a double-ended voltage output, dependent primarily upon the plate currents, coupled from the cathodes of each of the electron discharge devices.

Another feature of this invention is the use of a vacuum tube bridge circuit having therein a pair of vacuum tubes to the grids of which the outputs of the comparison circuits are coupled. Since each of the outputs from the electron discharge devices in the comparison circuits are referred to ground, each can be coupled to the grid of the vacuum tube in a leg of the vacuum tube voltmeter to produce an indication of the difference in the two input voltages.

The above-mentiond and other features and objects of this invention will become more apparent by reference to the following description taken in conjunction with the accompanying drawing, in which:

Fig. 1 is a schematic diagram in block form of one embodiment of an aerial navigation receiver utilizing the comparison circuitry of our invention; and Fig. 2 is a schematic circuit diagram of the comparison circuit in accordance with the principles of our invention.

Referring now to Fig. 1 of the drawing, a schematic diagram in block form of an aerial navigation radio receiver utilizing a comparison circuit in accordance with the principles of our invention is shown.

The aerial navigation receiver of Fig. 1 is intended to cooperate with a radio beacon transmitting pulse-coded R-F energy which is amplitude modulated with an envelope wave having a fundamental sinusoidal component and reference signal energy having at the receiver a phase relation relative to said sinusoid which determines the azimuth of the receiver to the beacon. Reference may be had to co-pending application of S. B. Pickles-S. H. M. Dodington-G. Stavis, Serial No. 395,648, filed December 2, 1953, now U.S. Patent No. 2,890,449, issued June 9, 1959, assigned to the same assignee as this application, for further information about a radio navigation system in which a receiver of the type shown in Fig. 1 may be utilized.

The signal radiated by the beacon portion of the navigation system induces voltages in the antenna 1 of the receiver equipment. These voltages are fed to the usual radio frequency (R-F) stage 2 and intermediate frequency (I.-F.) stage 3 whose output is coupled through a discriminator and amplifier circuit 4 to a video detector 5 where the pulse-coded signals emitted by the beacon are detected. If desired, an AGC (automatic gain control) loop 6 may be coupled from the output of the video detector 5 to the I.-F. stage 3 to automatically control the gain of the detected signals. The output of the video detector 5 is coupled to a peak-riding detector 7 to detect the envelope wave portion of the amplitude modulated pulse-coded energy transmitted by the beacon. This envelope wave is amplified and filtered in accordance with its fundamental sinusoidal frequency in circuit 8 whose output is coupled to a phase splitter 9. The output of the phase splitter is coupled over a manually positioned double arm potentiometer in which one arm contains a capacitive impedance 11 and the other arm a resistive impedance 12. The outputs of each of the arms are combined to form one input having a constant amplitude but of variable phase, to a comparison circuit 13. Thus, by moving the ganged arms of the potentiometer 10, a phase adjustment is provided to the input to the comparison circuit 13 and this adjustment of the double arms is indicated on a meter 14 mechanically coupled to the manually positioned potentiometer arms.

The output of the video detector 5 is also coupled to a limiter circuit 15 eliminating the amplitude variations from the pulse-coded signals. The reference signal is detected in circuit 16 and coupled as the second input to the comparison circuit 13. Reference may be had to the co-pending application of E. de Faymoreau-M. Mandel, Serial No. 519,303, filed July 1, 1955, now U.S. Patent No. 2,795,775 and assigned to the same assignee as this application, for further information about a reference signal detection circuit suitable for use in the receiver of Fig. 1.

The output of the comparison circuit 13 is coupled to a vacuum tube voltmeter 17 whose output is indicated on a left-right meter 18. Adjusting the double arms of the potentiometer 10 until the input to the comparison circuit from the phase splitter is exactly in phase with the reference signal from detector 16 causes the comparison circuit 13 to produce a zero difference in meter 17 which is indicated by the central location of the left-right meter 18. The adjustment necessary to bring about the zero reading on meter 18 is indicated on meter 14 which, in the aerial navigation system referred to above, would disclose the azimuth of the receiver to the beacon.

Referring now to a specific embodiment of the present invention illustrated in Fig. 2 of the drawing, it is seen that the input reference pulse 19 from reference pulse detector 16 is coupled via line 20 to the grids 21 and 22 of electron discharge devices 23 and 24 each having a cathode 25, 26 and anode 27, 28, respectively. The detected bearing envelope wave from phase splitter 9 coupled over line 9a through coupling condenser 29 is applied to the anode 28 of electron discharge device 24 and to the cathode 25 of electron discharge device 23. The output of each of the vacuum tubes 23 and 24 are coupled from the cathodes 25 and 26, respectively, through low-pass filters 30 and 31 each designed to reject frequencies of the fundamental sinusoidal components of the envelope wave. The double-ended output of the comparison circuit 13 is coupled to a novel vacuum tube voltmeter circuit 17 in which each of the inputs is coupled through a grid 32, 33, respectively, of vacuum tube 34 and 35, respectively, each of the tubes having a cathode 36, 37 and anode 38, 39, respectively. The anodes 38 and 39 are each coupled to a source of plate voltage and the cathodes are coupled together via resistor 40 in parallel with capacitor 41. Each of the cathodes are coupled to ground through resistors 42 and 43 and common potentiometer 44 whose arm 45 couples the cathodes through resistor 46 to ground.

The operation of the foregoing circuit is dependent upon the fact that when the pulse 19 is coupled to the grids 21 and 22 and a signal is coupled through condenser 29 to the plate 28 and cathode 25 and grid currents are caused to flow, the grid current of tube 24 will flow in a counterclockwise direction through resistors 47, 48 and 52. Simultaneously, the grid current of vacuum tube 23 will flow counterclockwise through resistors 47, 48 and 50. Thus, the grid currents of each of the vacuum tubes produce an in-phase output voltage resulting in little or no change in the direct current voltmeter readings. At the same time, the plate current due to vacuum tube 24 will flow in a clockwise direction over line 49 through resistors 50 and 52 and the plate current due to vacuum tube 23 will flow in a clockwise direction over line 51 through resistors 52 and 50. Note that these plate currents flow in opposite directions in load resistors 50 and 52. Thus, the plate current due to each of the vacuum tubes produces an out-of-phase voltage yielding a rapid change in the direct current voltmeter readings. Obviously, when the pulse input 19 and the sine wave input 19a are "in phase" and the vacuum tubes conduct equal plate currents the output signals taken from cathodes 25 and 26 are balanced. When the signals are out of phase and one or the other of the tubes conducts, then the outputs are unbalanced.

This phase relationship between signals 19 and 19a and the resulting effect in the circuit of Fig. 2 may be explained in somewhat greater detail as follows: When positive pulse input 19 occurs during the positive half cycle of sine wave input 19a, tube 24 is made to conduct plate current, due to the fact that the positive pulse on grid 22 and positive voltage on plate 28 overcome the negative bias on grid 22 which normally keeps the tube 24 cut off. The amplitude of this plate current depends on the relative phase relationship of signals 19 and 19a. It is greatest when pulse signal 19 occurs at the crest of sine wave signal 19a, and decreases as pulse signal 19 approaches the zero point of sine wave signal 19a.

When positive pulse input 19 occurs during the negative half cycle of sine wave input 19a, tube 23 is made to conduct plate current, due to the fact that the positive pulse on grid 21 and negative voltage on cathode 25 overcome the negative bias on grid 21 which normally keeps the tube 23 cut off. When positive pulse input 19 occurs exactly at the zero, or crossover point of sine wave input 19a, (the "in phase" condition) tubes 23 and 24 conduct equal and small plate currents, and the output signals taken from cathodes 25 and 26 are balanced.

Referring to the vacuum tube voltmeter 17, it is seen that unlike the usual vacuum tube voltmeter in which one of the grids of one of the vacuum tubes is coupled to ground each of the vacuum tubes 34 and 35 have a signal input coupled to their grids. This is feasible because the two signal outputs of the comparison circuit are each referred to ground potential and, therefore, the ground coupled to one of the grids of the normal vacuum tube voltmeter can be removed and a signal fed through allowing a voltage comparison to be made in the vacuum tube voltmeter. Inequality in signals coupled to the grids 32 and 33 of the vacuum tube voltmeter 17 produces a current flow through resistor 40 which can be indicated on an ammeter type of indicating instrument 52. Potentiometer 44 is provided to balance the circuit so that a zero reading is apparent on meter 52 when the input signals through tubes 34 and 35 are equal. If the input signals to the grids 32 and 33 are equal, no current flows in meter 52 indicating an in-phase condition for signals 19 and 19a.

While we have described above the principles of our invention in connection with specific apparatus, it is to be clearly understood that this description is made only by way of example and not as a limitation to the scope of our invention as set forth in the objects thereof and in the accompanying claims.

We claim:

1. A comparison circuit for producing an indication of the relative phase between a first and second input signal comprising a first and second electron tube each having a cathode, grid and anode, means for applying the first of said input signals to the grids of said first and second electron tubes, means for applying the second of said input signals to the anode of said first tube and the cathode of said second tube, means coupling together the anode of said second tube and the cathode of said first tube, means including a first load resistor connected from the cathode of said first electron tube to ground for coupling a first voltage output from the cathode of said first electron tube, and means including a second load resistor connected from the cathode of said second electron tube to ground for coupling a second voltage output from the cathode of said second electron tube.

2. In a comparison circuit according to claim 1, wherein the said second input signal has a sinusoidal waveform at a fundamental frequency, filter means included in each of the said output means for rejecting said fundamental frequency.

3. A comparison circuit for producing an indication of the relative phase between a first and second input signal comprising a first and second electron tube each having a cathode, grid and anode, means for applying the first of said input signals to the grids of said first and second electron tubes, means for applying the second of said input signals to the anode of said first tube and the cathode of said second tube, means coupling together the anode of said second tube and the cathode of said first tube, a third and fourth electron tube each having a cathode, grid and anode, means for coupling the cathodes of said first and second tubes to the grids of said third and fourth tubes, respectively, and a circuit including a resistance and a meter coupling together the cathodes of said third and fourth electron tubes for indicating the current flow between said cathodes.

4. In a radio navigation system receiver for determining azimuth position with respect to a beacon which transmits a rotating directional energy radiation pattern having a fundamental sinusoidal characteristic and a reference signal for said sinusoidal characteristic; a circuit comprising means to detect said fundamental sinusoidal characteristic, means to vary the phase of said detected sinusoidal signal, means for detecting said reference signal and comparison circuit means to compare the relative phase between said reference signal and said phase shifted fundamental sinusoidal signal, including a first and second electron discharge tube each having a cathode, anode and grid, means to couple said reference signal to the grids of said first and second electron tubes and means to couple said phase shifted sinusoidal signal to the cathode of said first tube and the anode of said second tube and means to couple a voltage output from each of the cathodes of said electron discharge tubes, means for comparing the amplitude of the voltage outputs coupled from said cathodes, means for indicating when said outputs are balanced, and means mechanically coupled to said phase-adjusting means for indicating the azimuth position with respect to said beacon when said outputs are balanced.

5. A comparison circuit for producing an indication of the relative phase between a first and second input signal comprising a first and second electron tube each having a cathode, grid and anode, grid bias means including a connection from said grids to a source of direct-current potential and resistance means connected from said grids to ground, means for applying the first of said input signals to the grids of said first and second electron tubes, means for applying the second of said input signals to the anode of said first tube and the cathode of said second tube, means coupling together the anode of said second tube and the cathode of said first tube, means including a first load resistor connected from the cathode of said first electron tube to ground for coupling a first voltage output from the cathode of said first electron tube, and means including a second load retsistor connected from the cathode of said second electron tube to ground for coupling a second voltage output from the cathode of said second electron tube, and means for comparing said first and second output voltages.

6. A comparison circuit for producing an indication of the relative phase between a pulse input signal and a repetitive sine wave signal comprising a first and second electron tube each having a cathode, grid and anode, means for applying said pulse signal to the grids of said first and second electron tubes, means for applying said sine wave to the anode of said first tube and the cathode of said second tube, means coupling a voltage output from each of the cathodes of said electron tubes, means for comparing the amplitude of the voltage outputs coupled from said cathodes, means for adjusting the phase of said sine wave applied to said first and second tubes to balance said voltage outputs, and means to indicate the degree of phase shift required to obtain said balance.

References Cited in the file of this patent

UNITED STATES PATENTS

| | | |
|---|---|---|
| 2,490,050 | Hansel | Dec. 6, 1949 |
| 2,493,772 | McCoy et al. | Jan. 10, 1950 |
| 2,527,096 | Howes | Oct. 24, 1950 |
| 2,541,313 | Vossberg et al. | Feb. 13, 1951 |
| 2,558,945 | Fritzinger | July 3, 1951 |
| 2,604,512 | Bacon et al. | July 22, 1952 |
| 2,676,291 | Perkins et al. | Apr. 20, 1954 |
| 2,708,718 | Weiss | May 17, 1955 |